US006373151B1

(12) United States Patent
Darrot et al.

(10) Patent No.: US 6,373,151 B1
(45) Date of Patent: Apr. 16, 2002

(54) MATRIX OF TWO-POSITION SWITCHES

(75) Inventors: Eric Darrot, Opio; Bruno Vaillant, Toulouse, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/455,489

(22) Filed: Dec. 6, 1999

(30) Foreign Application Priority Data

Dec. 7, 1998 (FR) .......................................... 98 15397

(51) Int. Cl.$^7$ ................................................ H04Q 1/00
(52) U.S. Cl. ..................... 307/115; 340/825.8; 370/220
(58) Field of Search ................................ 307/115, 112; 370/16, 54, 216, 217, 220, 387; 340/825.79, 825.8, 826, 827

(56) References Cited

U.S. PATENT DOCUMENTS

| | | | | |
|---|---|---|---|---|
| 5,325,090 A | * | 6/1994 | Goeldner | 370/54 |
| 5,329,520 A | * | 7/1994 | Richardson | 370/16 |
| 5,754,118 A | * | 5/1998 | Brunner | 307/401 |
| 5,982,746 A | * | 11/1999 | Hanson et al. | 370/220 |
| 6,087,958 A | * | 7/2000 | Arzt | 370/216 |

FOREIGN PATENT DOCUMENTS

EP          0 739 146 A2     10/1996

OTHER PUBLICATIONS

Shih, Jimmy et al.: "Adding Multiple–Fault Tolerance to Generalized Cube Networks" IEEE Transactions on Parallel and Distributed Systems, vol. 5, No. 8, Aug. 1994, pp. 785–792.*

Shen, S–M: "DBTest: An Efficient High–Performance, Fault–Tolerant Fabric for Broadband ISDN" Proceedings of the IEEE International Conference on Communications (ICC'95), Seattle, WA, USA, Jun. 18–22, 1995, pp. 1142–1146, XP000533166.

Bansal, P. K. et al.: "Fault Tolerant Double Tree Multistage Interconnection Network" Proceedings of the Tenth Annual Joint Conference of the IEEE Computer and Communication Societies (INFOCOM' 91), Bal Harbour, FL, USA, Apr. 7–11, 1991, pp. 462–468, XP000223369.

Funahashi, A. et al: "Fault Tolerence of the TBSF (Tandem Bunyan Switching Fabrics) and PBSF (Piled Banyan Switching Fabrics)" IEICE Transactions on Information and Systems, col. E79–D, No. 8, Aug. 1996, pp. 1180–1189, XP000628518.

\* cited by examiner

*Primary Examiner*—Josie Ballato
*Assistant Examiner*—R. Rios Cuevas
(74) *Attorney, Agent, or Firm*—Sughrue Mion, PLLC

(57) ABSTRACT

The present invention relates to a matrix of two-position switches for transferring a number of input signals to the same number of outputs. The matrix is controlled so that all permutations of the incoming signals are possible at the outputs. The matrix includes both a main matrix and a troubleshooting matrix. The troubleshooting matrix has the same number of inputs and outputs, neither of which number less than the smaller of the number of inputs of the main matrix or the number of outputs of the main matrix. The switches of the troubleshooting matrix are adapted and controlled so that they operate as a simple switch whose inputs consist of any pair of inputs of the troubleshooting matrix and whose two outputs consist of the two outputs of the troubleshooting matrix which have the same rank as the pair of inputs. The other inputs of the troubleshooting matrix are connected to the outputs of the same rank in the troubleshooting matrix. In the present invention, the troubleshooting matrix can be located either downstream or upstream with respect to the main matrix.

16 Claims, 3 Drawing Sheets

MATRIX OF TWO-POSITION SWITCHES

BACKGROUND OF THE INVENTION

Field of the Invention

The invention relates to a matrix of two-position switches.

Description of the Related Art

A matrix (array) of this kind has n inputs and p outputs. It routes any permutation of m incoming signals to the same number of outputs. The matrix is controlled so that all permutations of the m incoming signals are possible at m outputs. The numbers n and p can have any values. A matrix with p inputs and n outputs has a structure which is deduced by considerations of symmetry from that of a matrix with n inputs and p outputs. This being the case, the following description is restricted to a matrix for which the number p of outputs is not less than the number n of inputs.

Matrices of this kind are routinely used in telecommunications and computers. They are formed of a set of switches each of which has two inputs and two outputs. Each switch has two positions. In the first position the first input is connected to the first output and the second input is connected to the second output. In the second position the first input is connected to the second output and the second input is connected to the first output.

FIG. 1 shows one example of a prior art matrix with six inputs and six outputs.

In the figure, each switch 10 is represented by a square with two inputs $e_1$, $e_2$ and two outputs $s_1$, $s_2$.

In the position shown in full lines, $e_1$ is connected to $s_1$, and $e_2$ to $s_2$. In the second position, shown in dashed lines, $e_1$ is connected to $s_2$ and $e_2$ $_{to\ s1}$.

If a switch fails, the matrix may not be able to continue to function.

For a matrix to be able to tolerate the failure of a switch, the number of switches is generally greater than the minimum number needed.

To form a matrix tolerating failure of any switch, each switch 10 can be associated with a switch 12 connected in series, as shown in FIG. 2. If the switch 10 is stuck in one position, for example that corresponding to the connections $e_1$–$s_1$, and $e_2$–$s_2$, the switch 12 nevertheless enables $e_1$ to be connected to $s'_1$, or to $s'_2$ and $e_2$ to be connected to $s'_2$ or $s'_1$. However, that solution doubles the number of switches and is therefore costly.

On the other hand, if the aim is to limit the number of extra switches, the topology of the network equipped with additional switches must be determined case by case. This process is lengthy and complex if the number of inputs and outputs exceeds four or five.

SUMMARY OF THE INVENTION

The present invention is characterized in that each matrix is associated with an additional troubleshooting matrix which has the same number of inputs and outputs which is not less than the number n of inputs of the main matrix, the switches of the additional matrix being adapted so that it operates as a simple switch whose inputs consist of any pair of inputs of the troubleshooting matrix and whose two outputs consist of the two outputs of the troubleshooting matrix which have the same rank as the pair of inputs, the other inputs of the troubleshooting matrix being connected to the outputs of the same rank of that matrix.

It has been found that the only effect of the failure of a switch in the main matrix is that the signals at two particular outputs are permutated when an attempt is made to place the stuck switch in the inoperative position.

The troubleshooting matrix therefore has a much simpler role than the main matrix. It must be able to switch to a number $C_2^n$ or $C_2^p$ of pairs having the value:

$$C_2^n = \frac{n!}{2(n-2)!}, \text{ or } C_2^p = \frac{p!}{2(p-2)!}$$

whereas the main matrix must be able to form at least n! combinations. The troubleshooting matrix can therefore include a smaller number of switches and is easy to implement.

The inputs of the troubleshooting matrix can be connected to the outputs of the main matrix. The outputs of the troubleshooting matrix can be connected to the inputs of the main matrix. If a plurality of troubleshooting matrices is provided, they are connected in series, for example.

As an alternative to this, the troubleshooting matrix is inside the main matrix so that an input and an output of the same rank i of the troubleshooting matrix are interleaved into the path of a conductor conveying a signal to an output of particular rank $k_i$ of the main array, no other input/output pair of the troubleshooting matrix being interleaved into the path of the signal addressed to the output of rank $k_i$ of the main matrix.

In a first embodiment of the invention, a troubleshooting matrix intended for a main matrix with three inputs or outputs includes three switches connected in the following manner:

a first switch has an input constituting the first input of the troubleshooting matrix and an output of the same rank constituting the first output of the troubleshooting matrix and the second input of the first switch is connected to the first output of the second switch and its second output is connected to the first input of the third switch;

the inputs of the second switch constitute the second and third inputs of the troubleshooting matrix;

the outputs of the third switch constitute the second and third outputs of the troubleshooting matrix; and the second output of the second switch is connected to the second input of the third switch.

When the number n or p is greater than 3, the troubleshooting matrix can be implemented progressively, starting from the observation that if a troubleshooting matrix is available of order n or p (i.e. with n or p inputs and n or p outputs) a troubleshooting matrix of order n+1 or p+1 can be obtained by adding to the matrix of order n or p two switches connected like the second and third switches of the array of order 3.

In this case, the first output of the second switch is connected to an input of any rank i of the matrix of order n or p and the first input of the third switch is connected to the output of rank i of the matrix of order n or p. The inputs of the second switch constitute two inputs of the matrix of order n+1 or p+1 and the outputs of the third switch constitute two outputs of the matrix of order n+1+ or p+1. The inputs of the matrix of order n+1 or p+1 consist of n−1 or p−1 remaining inputs of the matrix of order n or p (because the input of rank i of the matrix of order n or p is no longer usable) and the two inputs of the second switch. Likewise, the outputs of the matrix of order n+1 or p+1 consist of n−1 or p−1 remaining outputs of the matrix of order n or p and the two outputs of the third switch.

In this embodiment, the troubleshooting matrix includes 2n−3 or 2p−3 switches.

In another embodiment, which minimizes the number of switches, a troubleshooting matrix is provided with n or p switches connected in the following manner:

the first input and the first output of the switch of rank i respectively constitute the input and the output of rank i of the troubleshooting matrix;

the second input of each switch is connected to the second output of the switch of immediately higher rank; and the second output of the switch of rank 1 is connected to the second input of the switch of rank n or p.

Regardless of which embodiment is chosen, the troubleshooting matrix corrects the main matrix fault that consists in a single switch of that matrix sticking.

If more severe faults are to be addressed, a plurality of troubleshooting matrices is used in which the number of troubleshooting matrices is equal to the predicted maximum number of switches that can be stuck simultaneously.

The present invention provides a matrix of two-position switches for transferring m input signals to the same number of outputs, the matrix being controlled so that all permutations of m incoming signals are possible at m outputs. The matrix is characterized in that it includes a main matrix and a troubleshooting matrix which has the same number of inputs and outputs, the switches of the troubleshooting matrix being adapted and controlled so that it operates as a simple switch whose inputs consist of any pair of inputs of the troubleshooting matrix and whose two outputs consist of the two outputs of the troubleshooting matrix which have the same rank as the pair of inputs, the other inputs of the troubleshooting matrix being connected to the outputs of the same rank of that matrix.

The number of inputs and outputs of the troubleshooting matrix is not less than the smaller of the two numbers n and p, where n is the number of inputs of the main matrix and p is the number of outputs of the main matrix.

In an embodiment of the invention the matrix includes a troubleshooting matrix with n+1 or p+1 inputs and n+1 or p+1 outputs, referred to as a matrix of order n+1 or p+1, obtained from a troubleshooting matrix with n or p inputs and n or p outputs, referred to as a matrix of order n or p, and two additional switches connected so that the first output of the first additional switch is connected to an input of rank i of the matrix of order n or p, the first input of the second additional switch is connected to the output of rank i of the matrix of order n or p, and the second output of the first additional switch is connected to the second input of the second additional switch, and the two inputs of the first additional switch constitute two inputs of the matrix of order n+1 or p+1 and the two outputs of the second additional switch constitute two outputs of the matrix of order n+1 or p+1.

In an embodiment of the invention the troubleshooting matrix includes n or p switches connected so that the first input and the first output of the switch of rank i respectively constitute the input and the output of rank i of the troubleshooting matrix, the second input of each switch is connected to the second output of the switch of immediately higher rank, and the second output of the switch of rank 1 is connected to the second input of the switch of rank n or p.

In a variant of this embodiment of the invention the troubleshooting matrix control means cause the switches corresponding to the pair of inputs and outputs to be switched to be operated in the event of a fault.

In an embodiment of the invention the troubleshooting matrix has p inputs and p outputs and its p inputs are connected to the p outputs of the main matrix.

In an embodiment of the invention the troubleshooting matrix is upstream of the main matrix and its n outputs are connected to the a inputs of the main matrix.

In an embodiment of the invention the troubleshooting matrix is inside the main matrix so that an input and an output of the same rank i of the troubleshooting matrix are interleaved into the path of a conductor carrying a signal to an output of particular rank of the main matrix, no other input/output pair of the troubleshooting matrix being interleaved into the path of the signal addressed to the output of particular rank of the main matrix.

In an embodiment of the invention the matrix includes a number of troubleshooting matrices equal to the predicted maximum number of switches of the main matrix which can be stuck simultaneously.

Other features and advantages of the invention become apparent from the description of embodiments of the invention given with reference to the accompanying drawings, in which:

DETAILED DESCRIPTION OF THE INVENTION

The present invention will be explained in further detail by making reference to the accompanying drawings, which do not limit the scope of the invention in any way.

Figure 1:
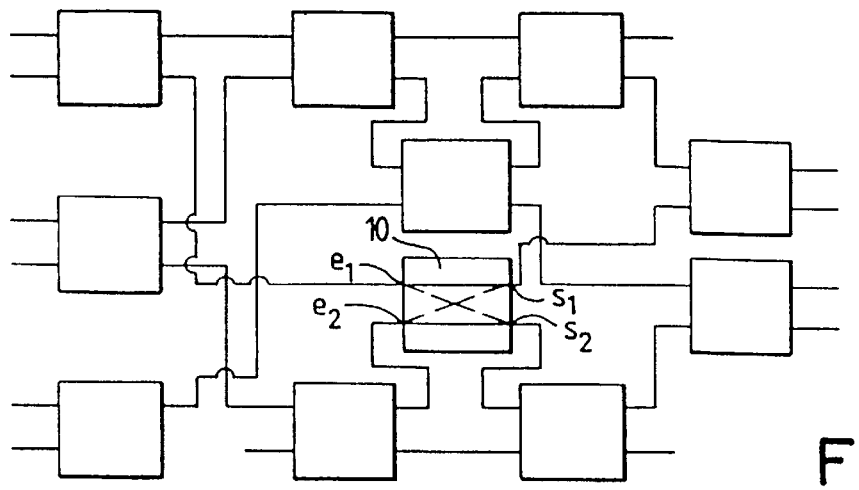
FIGS. 1 and 2, already described, respectively show a matrix of switches and two switches in series.
Figure 2:
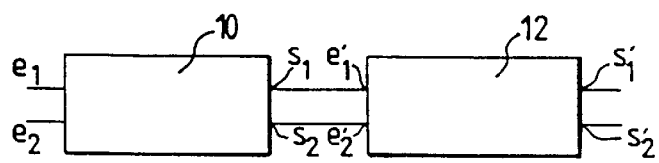

In a matrix of switches of the type shown in FIG. 1, the only faults that can occur in practice are stuck switches. A stuck switch continues to transmit to its outputs the signals that are applied to its inputs, but it can no longer fulfill its routing or switching function. For example, if the switch 10 shown in FIG. 2 sticks in the position shown, its input $e_1$ is always connected to its output $s_1$, and its input $e_2$ is always connected to its output $s_2$, and it is not possible to obtain the second position, i.e. to connect $e_1$ to $s_2$ and $e_2$ to $s_1$.

The effect of a stuck switch in the matrix is that, compared to the expected routing, the inoperative connection corresponds to signals at two outputs of the matrix being swapped over. In other words, if a switch that is commanded to route the input signals $e_r$ and $e_s$ to the outputs $s_i$ and $s_j$, respectively, happens to be stuck, then those input signals $e_r$ and $e_s$ are routed to the outputs $s_j$ and $s_i$, respectively, instead of to the outputs $s_i$ and $s_j$.

The matrix is generally associated with a control device for actuating each switch individually, and monitoring means are provided to verify that each switch is exercising its function correctly. For example, a matrix of the above kind is used in a telecommunications satellite which has a plurality of receive and transmit antennas, and the matrix is used to route signals from the receive antennas to the transmit antennas. In this case, the switches are commanded from the ground or by a program on the satellite, and each switch sends to the ground a signal monitoring the operation effected.

The switches are generally mechanical so that they can always transmit signals and so that the only faults that can occur are stuck switches. What is more, the switches are usually highly reliable and so the probability of a plurality of switches failing simultaneously is very low.

The invention provides an additional troubleshooting matrix having the same number of inputs and outputs as the matrix of switches to be protected against faults. This number is equal to the number D of outputs of the main matrix. It can also be equal to the number n of inputs of the main matrix. The troubleshooting matrix is adapted and controlled to re-establish the defective routing. In other words, if a switch of the main matrix is stuck, the troubleshooting matrix re-establishes the correct connections.

Figure 3A:
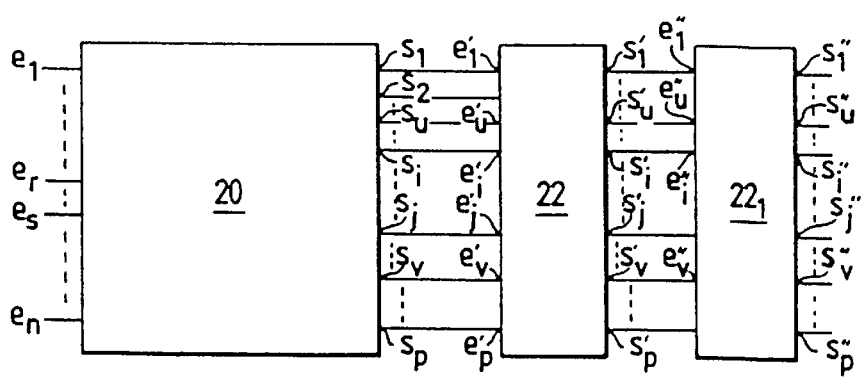
FIGS. 3*a*, 3*b* and 3*c* are diagrams showing three circuits combining troubleshooting matrices with a main matrix.

Accordingly, in FIG. 3a, the main matrix 20 has n inputs $e_1$ through $e_n$ and p outputs $s_1$, through $s_p$, p being greater than n, and the figure shows the inputs $e_r$ and $e_s$ together with the outputs $s_i$ and $s_j$ corresponding to the signals passing through the stuck switch. In the FIG. 3a example, a troubleshooting matrix 22 is provided with inputs $e'_1$ through $e'_p$ and outputs $s'_1$ through $s'_p$. In the absence of a fault the matrix 22 does not perform any routing and transmits the input $e'_1$ to the output $s'_1$, the input $e'_2$ to the output $s'_2$, etc. If a switch of the main matrix 20 is stuck, the troubleshooting matrix 22 is commanded so that, for the inoperative position (i.e. the position that cannot be obtained) of the stuck switch of the matrix 20, the input $e'_i$ is connected to the output $s'_j$ and the input $e'_j$ is connected to the output $s'_i$. The outputs $s'_1, s'_2, \ldots, s'_i, \ldots, s'_j, \ldots s'_p$ carry signals that have been routed correctly. The combination of the matrix 20 and the troubleshooting matrix 22 constitutes the switching matrix.

If a switch of the troubleshooting matrix 22 fails when there is no failed switch in the main matrix, then the main matrix 20 is commanded to correct the fault that has occurred in the matrix 22.

To address the simultaneous failure of more than one switch of the main matrix 20, a number of additional troubleshooting matrices is provided and this number is equal to the predicted maximum number of switches that can fail simultaneously in the main matrix.

Accordingly, FIG. 3a shows a second troubleshooting matrix $22_1$ whose inputs $e''_1$ through $e''_p$ are respectively connected to the outputs $s'_1, s'_p$ of the matrix 22 and whose outputs $s''_1$ through $s''_p$ then constitute the correct outputs. The second troubleshooting matrix $22_1$ inverts the output signals $s_u$ and $s_v$ corresponding to sticking of another switch of the main matrix when the first switch is still stuck. In other words, in the inoperative position of this other switch, the matrix $22_1$ connects its input $e''_u$ to its output $s''_v$ and conversely connects its input $e''_v$ to its output $s''_u$.

Figure 3B:
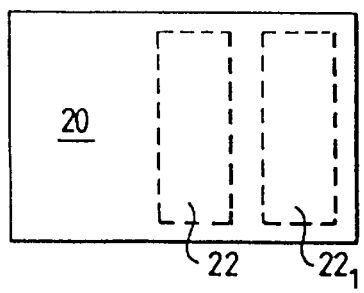

As shown in FIG. 3b, it is possible to dispose the troubleshooting matrices 22, 22, inside the main matrix 20 to be protected against faults. The matrix 22 is connected to the matrix 20 so that p conductors are chosen within the matrix 20 over which p different signals must still pass and the matrices 22 and 22, are interleaved into those conductors. To be more precise, the input and the output of rank i of the troubleshooting matrix are disposed on the path of the signal that should terminate at the output of the main matrix of the same rank i.

Figure 3C:
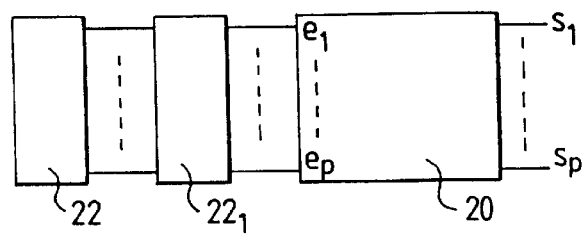

FIG. 3c shows another embodiment in which the troubleshooting matrices 22 and 22, are upstream of the matrix 20 to be protected. This minimizes the number of inputs and outputs (and therefore switches) of the troubleshooting matrix.

An embodiment of the troubleshooting matrix will now be described with reference to FIG. 4 for a main matrix with three outputs (if the inputs of the troubleshooting matrix are connected to the outputs of that matrix) or with three inputs (if the troubleshooting matrix is upstream of the main matrix).

The troubleshooting matrix 24 includes three switches 26, $28_3$ and $30_3$. The first input of switch 26 constitutes the first input $e'_1$ of matrix 24. Likewise, the first output of switch 26 constitutes the first output $s'_1$ of matrix 24. The two inputs of switch $28_3$ constitute the inputs $e'_2$ and $e'_3$ of matrix 24. In an analogous manner, the outputs of switch 303 constitute the outputs $s'_2$ and $s'_3$ of matrix 24. The first output $28_1$ of switch $28_3$ is connected to the second input $26_1$ of switch 26. In an analogous manner, the second output $26_2$ of switch 26 is connected to the first input $30_1$ of switch $30_3$. Finally, the second output $28_2$ of switch $28_3$ is connected to the second input $30_2$ of switch $30_3$.

If there is no fault in the main matrix 20, the switches are in the position shown in the figure, i.e. the inputs $e'_1, e'_2, e'_3$ are respectively connected to the outputs $s'_1, s'_2$ and $s'_3$.

If the input $e'_1$ must be connected to the output $s'_2$ and the input $e'_2$ to the output $s'_1$, it is sufficient to reverse the position of switch 26 and to leave switches $28_3$ and $30_3$ in the position shown.

Figure 4:
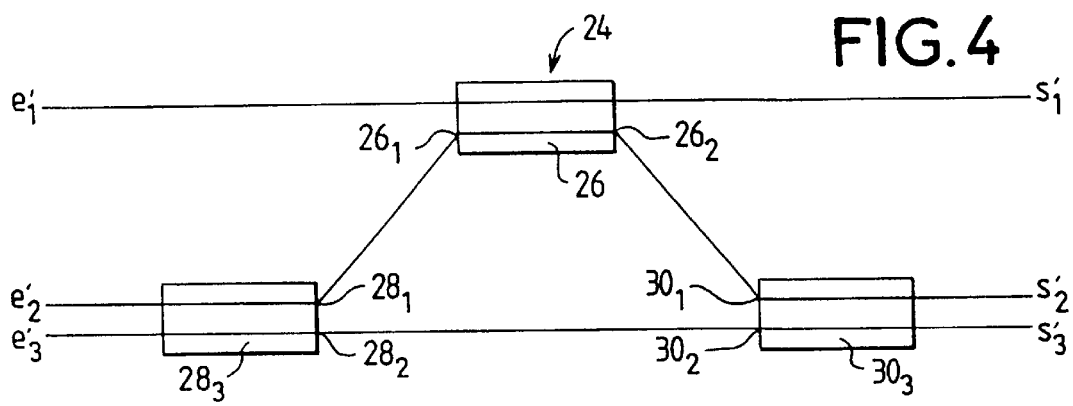
FIG. 4 is a diagram of an embodiment of a troubleshooting matrix with three inputs and three outputs.

If the input $e'_1$ must be connected to the output $s'_3$ and the input $e'_3$ to the output $s'_1$, each of the three switches 26, $28_3$ and $30_3$ is set to the position opposite that shown in FIG. 4.

To connect $e'_2$ to $s'_3$ and $e'_3$ to $s'_2$, all that is required is to set switch $28_3$ or switch $30_3$ to the second position and to leave the other two switches in the position shown.

Figure 5:
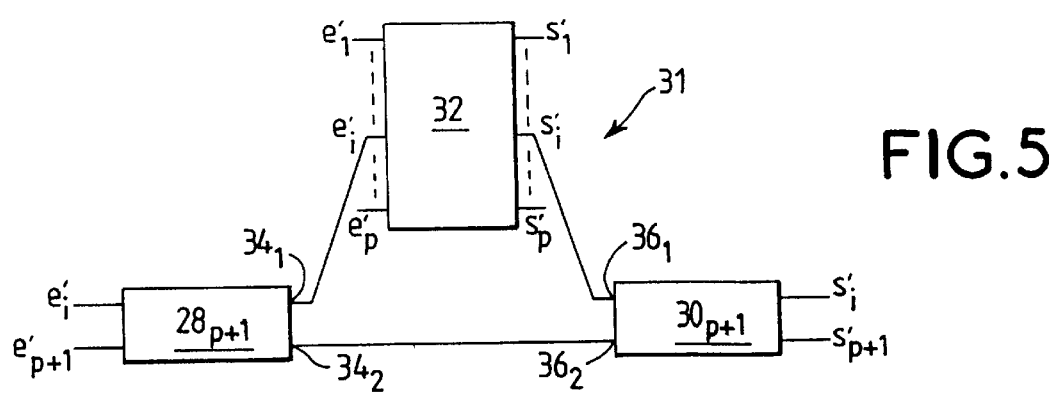
FIG. 5 is a diagram showing how a troubleshooting matrix with p+1 inputs and p+1 outputs can be obtained from a troubleshooting matrix with p inputs and p outputs.

FIG. 5 shows how a troubleshooting matrix with p+1 inputs (matrix of order p+1) can be obtained from a troubleshooting matrix with p inputs (matrix of order p). To this end, two switches $28_{p+1}$ and $30_{p+1}$ are associated with the troubleshooting matrix 32 of order p and are connected in the same manner relative to matrix 32 as switches $28_3$ and $30_3$ are connected relative to switch 26.

To be more precise: the first output $34_1$ of switch $28_{p+1}$ is connected to an input $e'_i$ (i can be chosen arbitrarily) of matrix 32; the output $s'_i$ of matrix 32 is connected to the first input $36_1$ of switch $30_{p+1}$ and the second output $34_2$ of switch 34 is connected to the second input $36_2$ of switch $30_{p+1}$.

In this case, the input $e'_i$ of the matrix of order p+1 is one of the two inputs of switch $28_{p+1}$, for example its first input, and the second input of switch $28_{p+1}$ constitutes the input $e'_{p+1}$. Likewise, the output $s'_i$ of the matrix of order p+1 is the first output of switch $30_{p+1}$ (if the first input of switch $28_{p+1}$ constitutes the input $e'_i$). The second output of switch $30_{p+1}$ constitutes the output $s'_{p+1}$ of the matrix of order p+1.

The operation of the troubleshooting matrix 31 can be deduced from that of the matrix 24 with three inputs and three outputs.

Figure 6:
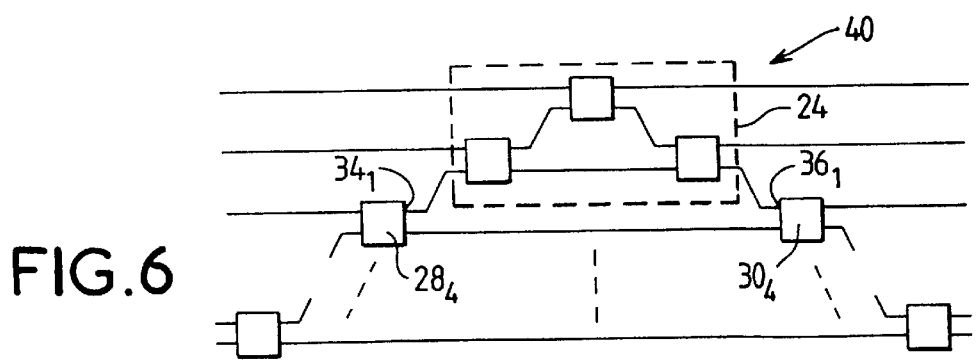
FIG. 6 is a diagram showing an embodiment of a troubleshooting matrix of order p.

The matrix 40 of order p shown in FIG. 6 is obtained by using the method described with reference to FIG. 5, but each time connecting the last input $e'_p$ of the matrix of order p to the first output $34_1$ of the additional switch $28_{p+1}$ and connecting the last output $s'_p$ of the matrix of order p to the first input $36_1$ of the additional switch $36_{p+1}$. Thus the first output $34_1$ of switch $28_4$ of the troubleshooting matrix of order 4 is connected to the input of rank 3 of the troubleshooting matrix 24 of order 3. Likewise, the first input 36, of switch $30_4$ is connected to the third output of the matrix 24 of order 3.

Figure 7:
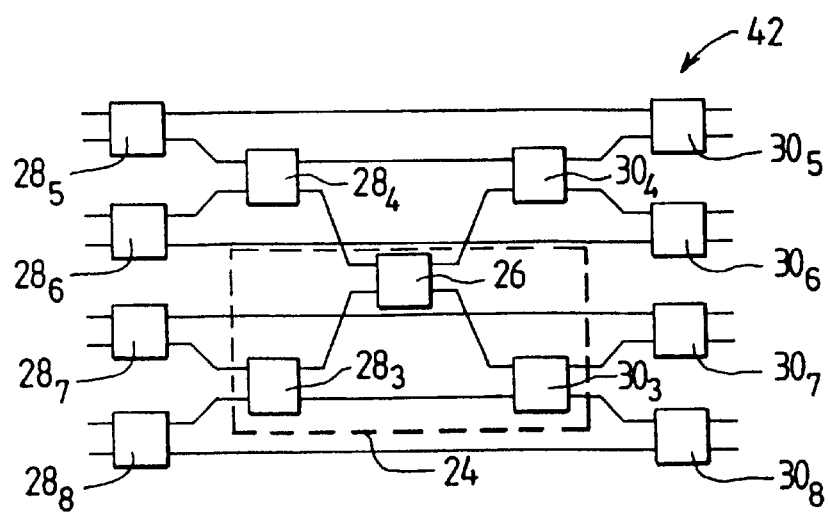
FIG. 7 is a diagram showing an embodiment of a troubleshooting matrix of order 8.

FIG. 7 is a diagram corresponding to a troubleshooting matrix of order 8.

The matrix 42 is also implemented using the method described with reference to FIG. 5. However, in this case, the rank i of the input and output to which the additional switches $28_{p+1}$ and $30_{p+1}$ are connected is chosen in the matrix of order p each time so that the structure is balanced, i.e. so that the great majority of signals pass through the same number of switches between the input and the corresponding output.

Accordingly, starting from the matrix 24 of order 3 with switches 26, $28_3$ and $30_3$, the matrix of order 4 is obtained by connecting switches $28_4$ and $30_4$ to the first input and to the first output, respectively, of the matrix 24 of order 3.

Each still available input and output of the troubleshooting matrix of order 4 is then used to connect the pairs of switches $28_5$, $30_5$; $28_6$, $30_6$; $28_7$, $30_7$ and $28_8$, $30_8$.

Figure 8:
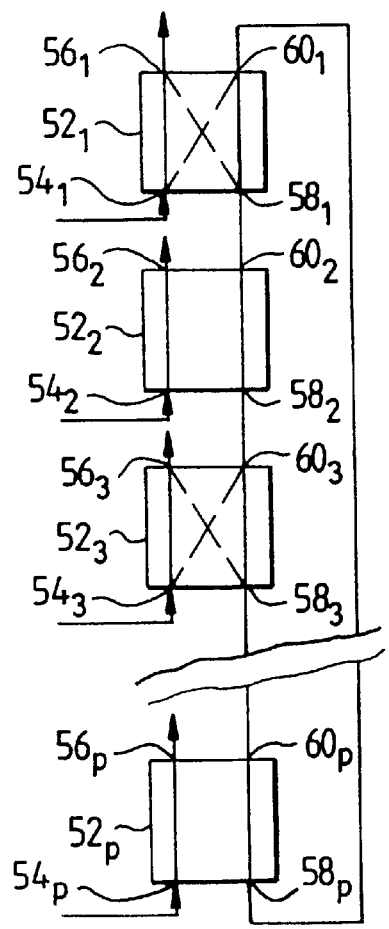
FIG. 8 is a diagram showing another embodiment of a troubleshooting matrix of order p.

In the embodiment of the invention shown in FIG. 8, the number of switches provided is equal to the number of inputs and outputs of troubleshooting matrix 50.

Each switch $52_i$, for example switch $52_2$, has a first input $54_2$ constituting the input of rank 2 of matrix 50 and a first output $56_2$ constituting the output of rank 2 of matrix 50. The second input $58_2$ of switch $52_2$ is connected to the second output $60_3$ of the next switch $52_3$. The second output $60_2$ of switch $58_2$ is connected to the second input $58_1$ of the switch $52_1$ of lower rank. Finally, the second output $60_1$ of the first switch $52_1$ is connected to the second input $58_p$ of the last switch $52_p$.

If there is no fault, the switches are in their first position, i.e. that for which the first input $54_i$ is connected to the first output $56_j$.

When a fault occurs in the main matrix, it is necessary to route the signal applied to input $54_i$ to output $56_{i+k}$ and the signal applied to input $54_{i+k}$ to output $56_i$. To this end switches $52_i$ and $52_{i+k}$ are placed in their second position.

Thus, in the example shown in FIG. 8, switches $52_1$ and $52_3$ are in the second position and the other switches are in the first position. This being the case, the signal applied to the input $56_1$ is passed to the second output $60_1$ of switch $52_3$, the second input $58_p$ of switch $52_p$ and the second input of switch $52_3$ to reach the first output $56_3$ of switch $52_3$. Likewise, the signal applied to the input $54_3$ of switch $52_3$ is passed to the second output $60_3$ of that switch and the second input $58_1$ of switch $52_1$ to reach the first output $56_1$ of switch $52_1$.

Although most of the examples are described with reference to a troubleshooting matrix connected downstream of the main matrix, it goes without saying that these examples can also be used in the situation where the troubleshooting matrix is on the upstream side. In this case, the troubleshooting matrix has n inputs and n outputs.

What is claimed is:

1. A matrix of two-position switches for transferring m input signals to the same number of outputs, the matrix being controlled so that all permutations of m incoming signals are possible at m outputs, characterized in that it includes:

a main matrix, and a troubleshooting matrix which has the same number of inputs and outputs which is not less than the smaller of the numbers n and p where n is the number of inputs of the main matrix and p is the number of outputs of said main matrix, the switches of the troubleshooting matrix being adapted and controlled so that said troubleshooting matrix operates as a simple switch whose inputs consist of any pair of inputs of the troubleshooting matrix and whose two outputs consist of the two outputs of the troubleshooting matrix which have the same rank as the pair of inputs of said troubleshooting matrix, wherein other inputs of the troubleshooting matrix are connected to the outputs of the same rank as said other inputs of said troubleshooting matrix.

2. A matrix according to claim 1, characterized in that it includes a troubleshooting matrix with n+1 or p+1 inputs and n+1 or p+1 outputs, referred to as a matrix of order n+1 or p+1, obtained from a troubleshooting matrix with n or p inputs and n or p outputs, referred to as a matrix of order n or p, and two additional switches connected so that:

the first output of the first additional switch is connected to an input of rank i of the matrix of order n or p;

the first input of the second additional switch is connected to the output of rank i of the matrix of order n or p; and the second output of the first additional switch is connected to the second input of the second additional switch;

and in that the two inputs of the first additional switch constitute two inputs of the matrix of order n+1 or p+1 and the two outputs of the second additional switch constitute two outputs of the matrix of order n+1 or p+1.

3. A matrix according to any preceding claim, characterized in that the troubleshooting matrix has p inputs and p outputs and its p inputs are connected to the p outputs of the main matrix.

4. A matrix according to any of claims 1 to 2, characterized in that the troubleshooting matrix is upstream of the main matrix and its n outputs are connected to the n inputs of the main matrix.

5. A matrix according to any of claims 1 to 2, characterized in that the troubleshooting matrix is inside the main matrix and an input and an output of the same rank i of the troubleshooting matrix are interleaved into the path of a conductor carrying a signal to an output of particular rank of the main matrix, no other input/output pair of the troubleshooting matrix being interleaved into the path of the signal addressed to the output of particular rank of the main matrix.

6. A matrix according to any of claims 1 to 2, characterized in that the it includes a number of troubleshooting matrices equal to the predicted maximum number of switches of the main matrix which can stick simultaneously.

7. A matrix of two-position switches for transferring m input signals to the same number of outputs, the matrix being controlled so that all permutations of m incoming signals are possible at m outputs, characterized in that it includes:

a main matrix, and a troubleshooting matrix which has the same number of inputs and outputs which is not less than the smaller of the numbers n and p where n is the number of inputs of the main matrix and p is the number of outputs of said main matrix, the switches of the troubleshooting matrix being adapted and controlled so that said troubleshooting matrix operates as a simple switch whose inputs consist of any pair of inputs of the troubleshooting matrix and whose two outputs consist of the two outputs of the troubleshooting matrix which have the same rank as the pair of inputs of said troubleshooting matrix, wherein other inputs of the troubleshooting matrix are connected to the outputs of the same rank as said other inputs of said troubleshooting matrix, and wherein the troubleshooting matrix includes n or p switches connected so that the first input and the first output of the switch of rank i respectively constitute the input and the output of rank i of the troubleshooting matrix, the second input of each switch is connected to the second output of the switch of immediately higher rank, and the second output of the switch of rank 1 is connected to the second input of the switch of rank n or p.

8. A matrix according to claim 7, characterized in that the troubleshooting matrix control means cause the switches corresponding to the pair of inputs and outputs to be switched to be operated in the event of a fault.

9. A matrix according to claim 7, characterized in that the troubleshooting matrix has p inputs and p outputs and its p inputs are connected to the p outputs of the main matrix.

10. A matrix according to claim 8, characterized in that the troubleshooting matrix has p inputs and p outputs and its p inputs are connected to the p outputs of the main matrix.

11. A matrix according to claim 7, characterized in that the troubleshooting matrix is upstream of the main matrix and its n outputs are connected to the n inputs of the main matrix.

12. A matrix according to claim 8, characterized in that the troubleshooting matrix is upstream of the main matrix and its n outputs are connected to the n inputs of the main matrix.

13. A matrix according to claim 7, characterized in that the troubleshooting matrix is inside the main matrix and an input and an output of the same rank i of the troubleshooting matrix are interleaved into the path of a conductor carrying a signal to an output of particular rank of the main matrix, no other input/output pair of the troubleshooting matrix being interleaved into the path of the signal addressed to the output of particular rank of the main matrix.

14. A matrix according to claim 8, characterized in that the troubleshooting matrix is inside the main matrix and an input and an output of the same rank i of the troubleshooting matrix are interleaved into the path of a conductor carrying a signal to an output of particular rank of the main matrix, no other input/output pair of the troubleshooting matrix being interleaved into the path of the signal addressed to the output of particular rank of the main matrix.

15. A matrix according to claim 7, characterized in that the it includes a number of troubleshooting matrices equal to the predicted maximum number of switches of the main matrix which can stick simultaneously.

16. A matrix according to claim 8, characterized in that the it includes a number of troubleshooting matrices equal to the predicted maximum number of switches of the main matrix which can stick simultaneously.

* * * * *